April 18 1950     A. BOUWERS     2,504,384
REFLEX CAMERA WITH CATADIOPTRIC OPTICAL SYSTEM
Filed Dec. 26, 1945
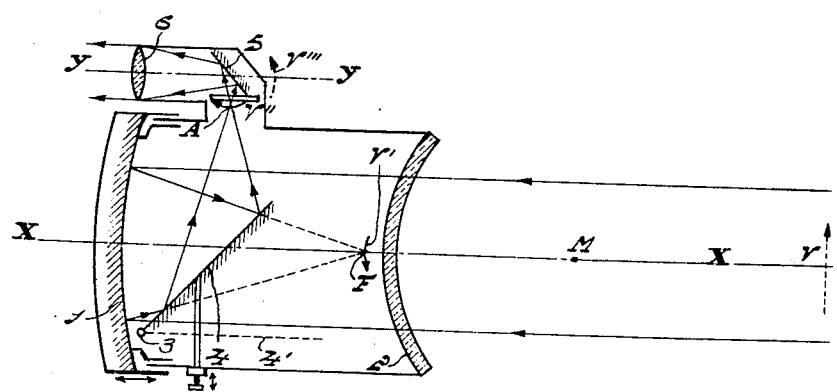
INVENTOR
ALBERT BOUWERS
BY
ATTORNEY Patented Apr. 18, 1950

2,504,384

UNITED STATES PATENT OFFICE 2,504,384

REFLEX CAMERA WITH CATADIOPTRIC OPTICAL SYSTEM

Albert Bouwers, Delft, Netherlands, assignor to N. V. Optische Industrie "De Oude Delft," Delft, Netherlands Application December 26, 1945, Serial No. 637,190
In the Netherlands May 2, 1942

Section 1, Public Law 690, August 8, 1946
Patent expires May 2, 1962

1 Claim. (Cl. 95—42)

This invention relates to a camera comprising an objective employing a concave mirror.

Objectives having the above-mentioned property generally have a very high luminous power. This constitutes a great advantage for many uses, but entails the difficulty that owing to the large relative aperture of these objectives the depth of definition is small so that adjustment of the objective in making an exposure should take place very accurately. This difficulty may be met by designing the camera as a reflex camera. In reflex cameras having concave mirror objectives, the difficulty has been encountered that if an arrangement is provided for viewing the image in the direction in which the camera is pointed, the observer sees the image upside down.

The present invention has for its object to avoid these difficulties. The invention concerns a camera of the kind referred to above, which exhibits the feature that a movable mirror is placed in the way of the rays issuing from the objective, which mirror projects an image which can be seen by means of an optical system comprising an eyeglass or magnifying glass and another mirror substantially at right angles to the movable mirror in its operative position, the direction of observation in this optical system being parallel or substantially parallel with the optical axis at the objective.

Owing to the fact that the two mirrors extend substantially at right angles to each other the inversed image obtained by means of the objective is inversed anew, so that the optical system in question yields an erect image of the object to be photographed. Since the direction of observation in this optical system is parallel or substantially parallel with the optical axis of the objective the advantage is obtained that the user of the camera according to the invention is able to view in the same direction both the object to be exposed and the finder image which contributes to a quick and easy operation of such a camera. In accordance with the conditions, deviations, preferably being of the order of magnitude of 10° at the utmost, from the relatively parallel direction of observation in the optical system and the optical axis of the objective are admissible.

More particularly in view of the comparatively small depth of definition of the camera according to the invention it is desirable that the camera should be adjusted very accurately. To this end a suitable form of construction of the camera according to the invention exhibits the feature that it is sharply adjusted by the simultaneous sharp visualization of the finder image projected by the movable mirror and adjusting means, such as a frosted glass or cross wires.

The invention will be more fully explained by reference to the accompanying drawing.

This drawing schematically represents one form of construction of the camera according to the invention. The mirror objective forming part thereof consists of a mirror 1 having a spherical surface and a relative aperture in the ratio 1:1. The centre of curvature of this mirror is at M. In order to cure the errors of the mirror 1 a correcting element 2 is placed in the path of the rays. This element has spherical limiting faces, whose centres of curvature are also at M, and has a low negative power. The mirror 1 forms an inversed image V' of an object V at a large distance from the camera. The image V' is located in the focal plane F of the mirror 1 and is curved. For the sake of clearness this curvature has been exaggerated in the drawing. A mirror 4 placed in the path of the rays issuing from the objective is able to rotate about the axis 3 and, in its active position, occupies the position indicated by a full line, but in taking an exposure occupies the position 4' indicated in dotted lines. When this mirror occupies its operative position it projects at A an image V" of the object to be photographed. Another mirror 5, whose plane is about normal to the operative position of the mirror 4, projects an image V''' from V". Owing to the presence of the mirrors 4 and 5 this finder image V''' is erect and can be viewed by means of the magnifying glass 6.

From the drawing it is apparent that the axis X—X of the objective and the axis Y—Y of the finder are parallel. The curvature of the image field of the objective and of the magnifying glass 6 are opposite to each other which constitutes an advantage.

In order to permit the camera to be accurately adjusted a fixed frosted glass as shown is available at A. The camera is adjusted accurately if the image of the object to be exposed is viewed in sharp relief through the magnifying glass on the frosted glass. If this is not the case the camera must be adjusted accurately which may, for instance, be effected by shifting the spherical mirror 1 into the direction of the axis X—X.

What I claim is:

A reflex camera comprising an objective having a single concave mirror and a focal surface, a correcting lens of a low negative power and spherical limiting faces spaced from said concave mirror toward an object of said camera, the centers of curvature of said concave mirror and said faces of said correcting lens being at a common point beyond said correcting lens, a first substantially plain mirror angularly adjustably secured between said concave mirror and said correcting lens, means for positioning said first plain mirror in a first and a second position, a reference element determining the position of an image surface, said first plain mirror in its first position being partially interposed between said concave mirror and said focal surface to reflect light from said concave mirror outside said objective to said image surface and to form an image thereat, a second substantially plain mirror positioned substantially at right angles and facing said first plain mirror in its first position with said image surface interposed between said plain mirrors, and an ocular arranged to permit an observer viewing in the direction faced by said concave mirror to view an image formed at said image surface after reflection from said second plain mirror, said ocular having its optical axis substantially parallel to the optical axis of said objective, said first plain mirror in its second position being arranged in a position noninterposed between said concave mirror and said focal surface, and means to position adjustably said concave mirror along its optical axis to bring into focus an image at said image surface with said plain mirror in its first position, said concave mirror in its adjusted position being arranged to focus an image on said focal surface with said first plain mirror in its second position, said image formed on said focal surface being curved, the curvature of the image field of the objective and the lens of said ocular being opposite.

ALBERT BOUWERS.

REFERENCES CITED

The following references are of record in the file of this patent:

UNITED STATES PATENTS

| Number | Name | Date |
| --- | --- | --- |
| 1,967,215 | Acht | July 24, 1934 |
| 2,152,202 | Miller et al. | Mar. 28, 1939 |
| 2,166,102 | Wild | July 18, 1939 |
| 2,323,005 | Bertele | June 29, 1943 |

OTHER REFERENCES

Scientific American, August 1939, published in New York, New York Telescoptics, pages 118–123.

Ser. No. 304,702, Kuppenbender (A. P. C.), published May 4, 1943.

Maksutov, "New Catadioptric Mensicus Systems," volume 34, No. 5, Journal of the Optical Society of America, May 1944, pages 270 to 289, 273, and 278 to 280.